(12) United States Patent
Chen et al.

(10) Patent No.: US 6,393,137 B1
(45) Date of Patent: May 21, 2002

(54) MULTI-RESOLUTION OBJECT CLASSIFICATION METHOD EMPLOYING KINEMATIC FEATURES AND SYSTEM THEREFOR

(75) Inventors: Hai-Wen Chen; Harry A. Schmitt; Jack G. Riddle, all of Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/335,427

(22) Filed: Jun. 17, 1999

(51) Int. Cl.[7] ................................................. G06K 9/00
(52) U.S. Cl. ...................................... 382/103; 382/240
(58) Field of Search .................................. 382/132, 128, 382/103, 240, 219, 248, 209, 217, 218, 190, 191; 342/90; 378/62; 607/27; 600/509, 578

(56) References Cited

U.S. PATENT DOCUMENTS 5,063,603 A  * 11/1991  Burt ........................... 382/132
6,154,567 A  * 11/2000  McGarry ..................... 382/219
6,292,592 B1 *  9/2001  Braunreiter et al. ........ 382/240

* cited by examiner

Primary Examiner—Andrew W. Johns
Assistant Examiner—Seyed Azarian

(74) Attorney, Agent, or Firm—William J. Benman; Colin M. Raufer; Glenn H. Lenzen, Jr.

(57) ABSTRACT

A multi-resolution feature extraction method and apparatus. In the illustrative embodiment, the feature extractor includes circuitry for receiving and transforming a time variant data signal into a multi-resolution data signal. The multi-resolution data signal is compared to each of a plurality of object templates. The system then generates a feature vector based on a correlation of the multi-resolution data signal to one of the object templates. The multi-resolution feature extraction method employs object templates formed by transforming time variant image data for each of a plurality of objects into a respective multi-resolution template and averaging all templates for each respective object. The method includes steps for transforming an incoming time variant data signal into a multi-resolution data signal, comparing the multi-resolution data signal to each of the object templates, and generating a feature vector when the multi-resolution data signal correlates to one of the object templates. In a more specific implementation, the method further includes the steps of calculating a confusion matrix (CM), classifying the feature vectors as one of the objects to thereby produce classified objects responsive to the CM, and selecting a target from the classified objects. A multi-resolution feature extractor according to the present invention employs object templates formed by transforming time variant image data for each of a plurality of objects into a respective multi-resolution template and averaging all templates for each respective object to thereby generate object templates.

17 Claims, 7 Drawing Sheets

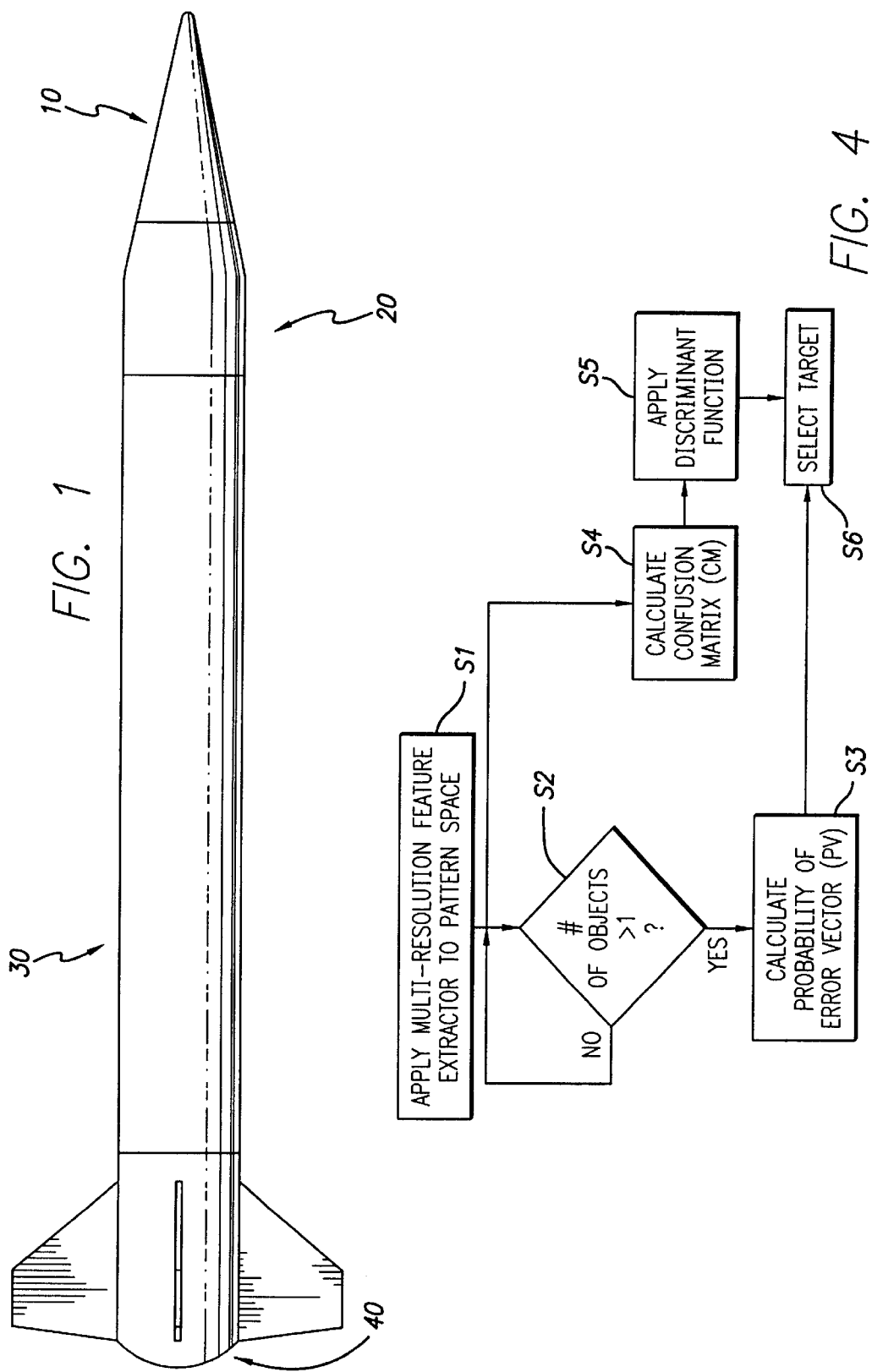

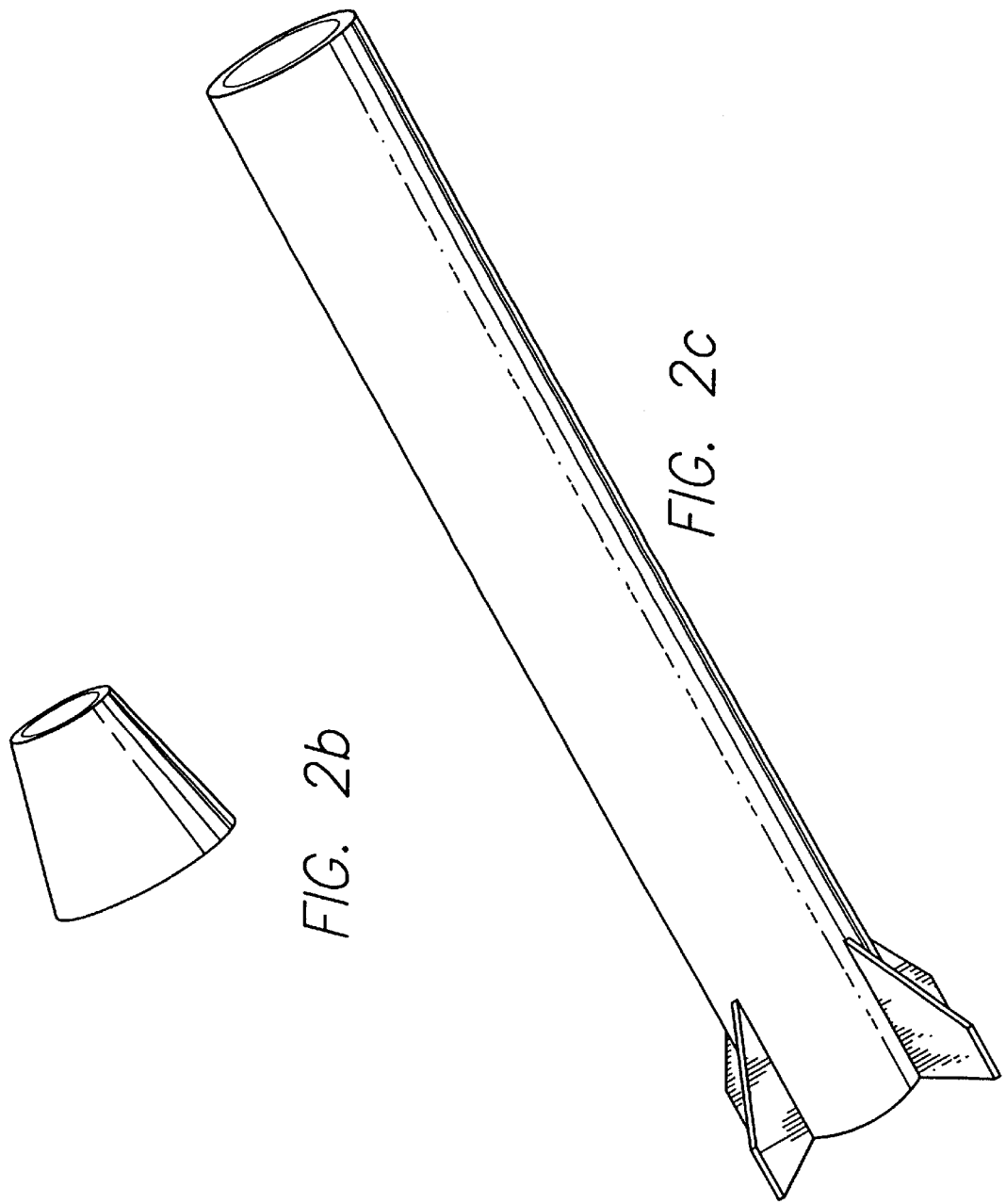
FIG. 2c
FIG. 2b
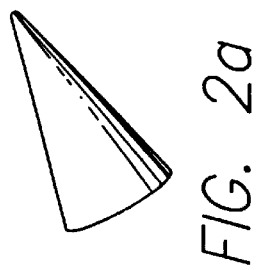
FIG. 2a

| Estimated Feature Source | Feature Description |
|---|---|
| Focal Plane Position Of Objects | • Line of Sight Angle<br>• Line of Sight Angle Rate |
| Features Estimate from Time History Statistics | • Modulation Index |
| Single Waveband Radiometry | • Radiant Intensity |
| Multiple Waveband Radiometry | • Absolute Temperature<br>• Emissivity–Area Product |
| Spectral Features (Fourier) | • Power Spectral Density<br>  • Peak<br>  • Symmetry |
| Spectral Features (Multi-Resolution) | • Intensity in the second lowest sub-band<br>• Temporal profile in lowest frequency sub-band<br>• Modulation intensity<br>• DC level |

*FIG. 7a*

|  | RV (Training) | ACM | BOOST | DEBRIS | ~FOV | ~TRK |
|---|---|---|---|---|---|---|
| RV (Performance) | 500 | 0 | 0 | 0 | 0 | 0 |
| ACM | 127 | 208 | 64 | 62 | 0 | 39 |
| BOOST | 146 | 0 | 15 | 3 | 336 | 0 |
| DEBRIS | 28 | 25 | 26 | 36 | 336 | 49 |

*FIG. 7b*

|  | Target | ~Target | ~FOV | ~TRK |
|---|---|---|---|---|
| Target | 1.00 | 0.00 | 0.00 | 0.00 |
| ~Target | 0.20 | 0.30 | 0.44 | 0.06 |

*FIG. 7c*

|  | RV | ACM | BOOST | DEBRIS | ~FOV | ~TRK |
|---|---|---|---|---|---|---|
| RV | 500 | 0 | 0 | 0 | 0 | 0 |
| ACM | 126 | 208 | 63 | 64 | 0 | 39 |
| BOOST | 146 | 0 | 15 | 3 | 336 | 0 |
| DEBRIS | 32 | 25 | 26 | 37 | 336 | 44 |

*FIG. 7d*

|  | RV | ACM | BOOST | DEBRIS | ~FOV | ~TRK |
|---|---|---|---|---|---|---|
| RV | 500 | 0 | 0 | 0 | 0 | 0 |
| ACM | 28 | 265 | 129 | 39 | 0 | 39 |
| BOOST | 32 | 63 | 68 | 1 | 336 | 0 |
| DEBRIS | 26 | 27 | 27 | 35 | 336 | 49 |

FIG. 7e

|  | Target | ~Target | ~FOV | ~TRK |
|---|---|---|---|---|
| Target | 1.00 | 0.00 | 0.00 | 0.00 |
| ~Target | 0.06 | 0.44 | 0.44 | 0.06 |

FIG. 7f

|  | RV (Training) |
|---|---|
| RV (Performance) | 428 |
| ACM | 37 |
| BOOST | 30 |
| DEBRIS | 5 |

FIG. 7g

|  | RV (Training) |
|---|---|
| RV (Performance) | 0.86 |
| ACM | 0.07 |
| BOOST | 0.06 |
| DEBRIS | 0.01 |

FIG. 7h

MULTI-RESOLUTION OBJECT CLASSIFICATION METHOD EMPLOYING KINEMATIC FEATURES AND SYSTEM THEREFOR

BACKGROUND OF THE INVENTION

1. Field of the Invention

The present invention relates to methods and systems for feature extraction and object classification. More specifically, the present invention relates to multi-resolution signal processing methods and systems for extraction and classification of embedded features.

2. Description of the Related Art

Standard object classification methodology begins with a "physical world," composed of the object classes that the user desires to discriminate. For example, the standard missile-3 (SM-3) Advanced Light-Weight Exo-Atmospheric Projectile (LEAP) infrared (IR) seeker takes measurements (images) of these objects and the raw imagery is then pre-processed using a collection of algorithms. At this point, the data space is highly redundant. The data is then mapped by some unitary transformation, e.g., Principal Components, Spectral Decomposition, Time-Frequency Decomposition, etc. This so-called feature space will in general have a greatly reduced dimensionality. The feature set is then used as input for a classifier. This process is generally described in U.S. Pat. No. 5,093,869, which is incorporated herein by reference.

The primary objective of the object classifier is to discriminate the reentry vehicle (RV) from the other three object classes. A secondary goal of the object classifier is to reduce misclassifications among the remaining objects.

It will be appreciated that since all of the observed objects in the TBM mission will be sub-pixel, only the temporal information is available for the discrimination task. Therefore, an accumulating time period is needed to collect the temporal data before initiating the discrimination task. A well-designed object classifier would use a shorter temporal data length and, thus, a reduced accumulating time period, but still provide good classification performance.

The most commonly employed approaches to the feature extraction problem are based on either Fourier analysis or eigenvalue decomposition methods. It will be appreciated that the current Feature Extraction algorithm of choice for SM-3 LEAP designs is based on Power Spectral Densities (PSDs). Of critical importance, SM-3 LEAP systems must be able to maintain their current classifier design, since the classifier is very sophisticated and has shown excellent performance against simulated data sets.

As mentioned above, one possible algorithm for TBM target discrimination is a Fourier technique based on the construction of PSD templates. Moreover, the main goal is to separate the RV from the other three object classes, i.e., an associated object, a booster, and burnt solid fuel. At a very high level, the general procedure is to pre-compute and store—for each object class—the averaged PSD templates as well as the mean and covariance matrices for several thousand Monte-Carlo simulation runs. From an analysis of these templates, it is possible to identify features that can be used to construct the feature vector. For each object observed, a PSD is generated, compared to the pre-computed PSD template for the RV and a feature vector is formed. This feature vector is then used to calculate the discriminant function, $g^i$, for each object class. The largest of these discriminant functions then corresponds to the object class.

Hence, there is a need in the art for a multi-resolution feature extraction method and corresponding system providing a greatly expanded feature space. It would be desirable if the expanded feature space produced by the multi-resolution feature extraction method and corresponding system could be efficiently and adaptively calculated. What is also needed is a multi-resolution feature extraction method and system which permits generation of a relatively higher quality of extracted features, which leads directly to improved classifier performance. It would be beneficial if the classifier could be simplified by virtue of the higher quality of the extracted features.

SUMMARY OF THE INVENTION

The need in the art is addressed the multi-resolution feature extraction method and corresponding apparatus of the present invention. In the illustrative embodiment, the feature extractor includes circuitry for receiving and transforming a time variant data signal into a multi-resolution data signal. The multi-resolution data signal is compared to each of a plurality of object templates. The system then generates a feature vector based on a correlation of the multi-resolution data signal to one of the object templates.

The multi-resolution feature extraction method according to the present invention, employs object templates formed by transforming time variant image data for each of a plurality of objects into a respective multi-resolution template and averaging all templates for each respective object. The inventive method includes steps for transforming an incoming time variant data signal into a multi-resolution data signal, comparing the multi-resolution data signal to each of the object templates, and generating a feature vector when the multi-resolution data signal correlates to one of the object templates.

In a more specific implementation, the inventive method further includes the steps of calculating a confusion matrix (CM), classifying the feature vectors as one of the objects to thereby produce classified objects responsive to the CM, and selecting a target from the classified objects. Preferably, the method also includes a step for, when there are more than one of the objects in the incoming time variant data signal, computing a probability-of-error vector (PV), so that the selecting step can select a target from the classified objects responsive to the PV.

Additionally, a multi-resolution feature extractor according to the present invention employs object templates formed by transforming time variant image data for each of a plurality of objects into a respective multi-resolution template and averaging all templates for each respective object to thereby generate object templates. Preferably, the multi-resolution feature extractor includes a memory which stores the object templates, and a feature extractor which transforms an incoming time variant data signal into a multi-resolution data signal, compares the multi-resolution data signal to each of the object templates, and generates a feature vector when the multi-resolution data signal correlates to one of the object templates.

Moreover, a multi-resolution seeker system constructed in accordance with the present teachings includes a memory and a feature extractor operatively connected thereto. The system converts time variant image data for each of a plurality of objects into a respective multi-resolution template, averages all templates for each respective object to thereby generate object templates, transforms an incoming time variant data signal into a multi-resolution data signal, compares the multi-resolution data signal to each of the object templates, and generates a feature vector each time the multi-resolution data signal correlates to one of the object templates. A processor calculates a confusion matrix (CM). A classifier operatively connected to the memory classifies the feature vectors as one of the objects responsive to the CM to thereby produce classified objects. A selector operatively coupled to the memory selects a target from the classified objects.

According to one aspect of the inventive system, the processor, when there are more than one of the objects in the incoming time variant data signal, computes a probability-of-error vector (PV), to permit the selector to select the target from the classified objects responsive to the PV.

BRIEF DESCRIPTION OF THE DRAWINGS

FIG. 1 illustrates the four object classes subject to feature extraction and classification by a tracking system.

FIGS. 2a–2c depict three-dimensional (3-D) models of selected ones of the four objects illustrated in FIG. 1.

FIG. 4 is a high-level flow chart depicting the operation of the system illustrated in FIG. 3, including the multi-resolution feature extraction method according to the present invention.

FIGS. 7a–7h are tables illustrating various aspects of the multi-resolution feature extraction method and corresponding system according to the present invention.

DESCRIPTION OF THE INVENTION

Figure 3:
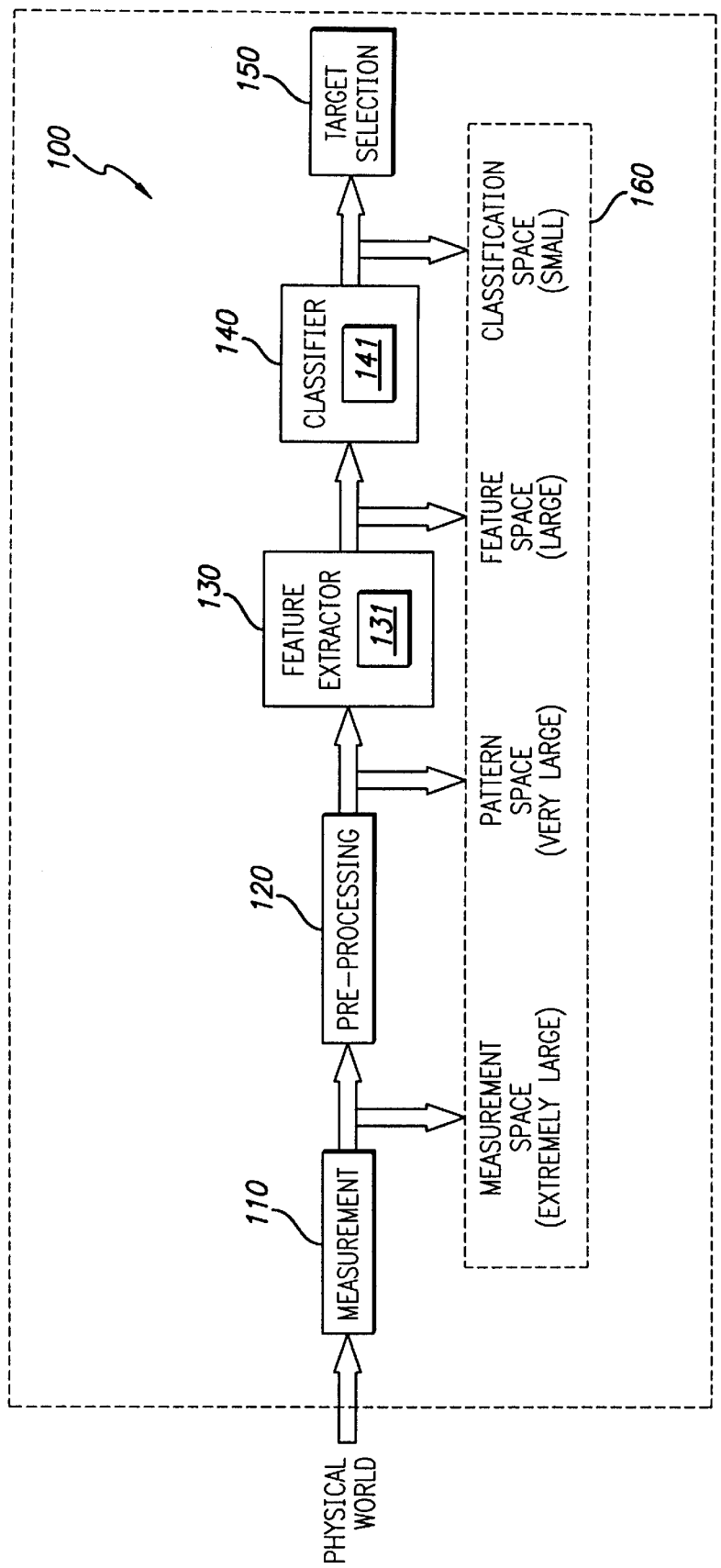
FIG. 3 is a high-level block diagram of a pattern recognition system employing the multi-resolution feature extraction method according to the present invention.
Figure 5A:
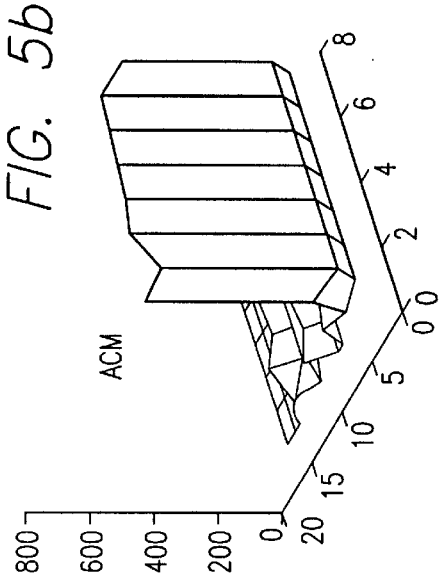
FIGS. 5a–5d illustrate three-dimensional plots generated by the multi-resolution feature extractor illustrated in FIG. 3 for the various objects depicted in FIG. 1.
Figure 5B:
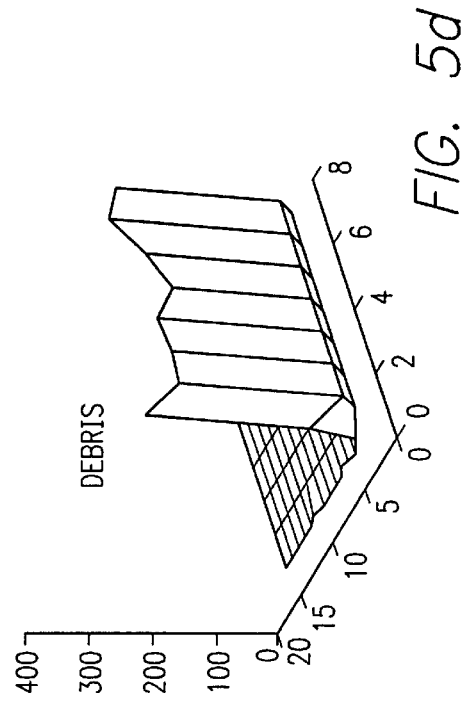
Figure 5C:
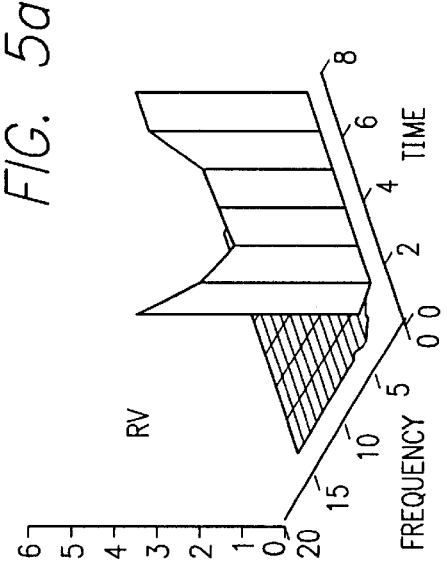
Figure 5D:
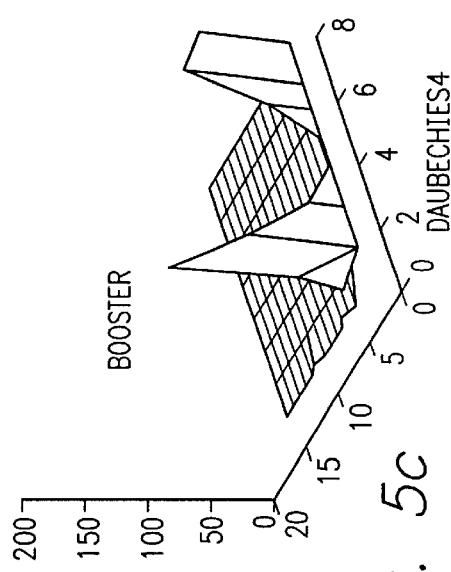

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The multi-resolution feature extraction method and corresponding system of the present invention permits the application of multi-resolution signal processing techniques for improving object classification, particularly for, but not limited to, Theater Ballistic Missile Defense (TBMD) applications. The specific mission parameters (e.g., threat set, operational environment, etc.) are taken from the Standard Missile 3 Advanced Light-Weight Exo-Atmospheric Projectile (LEAP) program, i.e., (SM-3 LEAP). However, it will be appreciated that these techniques are quite general. It will also be appreciated that there are a myriad of multi-resolution algorithms, all of which have particular advantages for selected classification problems, and all of which are considered to fall with the scope of the present invention. These algorithms include, but were not limited to, Discrete Wavelet Transform (DWT), Discrete Wavelet Packet (DWP), Discrete Cosine Packet DCP), and Local Discriminant Bases (LDB).

As will be discussed in greater detail below, the multi-resolution feature extraction method and associated system provide significant advantages over conventional feature extraction systems. For example, multi-resolution processing provides a natural de-noising capability. Stated another way, multi-resolution processing advantageously increases the overall system's immunity to IR seeker noise. Moreover, the multi-resolution processing can be implemented at a lower computational complexity than conventional feature extractors. In an exemplary, non-limiting case, multi-resolution processing employing DWT actually has a lower computational complexity than the FFT, i.e., $O(n)$ vice $O(n\log[n])$. In addition, both DWP and LDB have much lower complexity than eigenvalue decompositions such as Karhunen-Loeve Transforms, i.e., $O(n\log[n])$ or $O(n\log^2[t])$ vice $O(n^3)$. In addition, the LDB has shown significant promise as a replacement for Principal Component based algorithms. An important consideration is that LDB requires $O(n\log^2[n])$ operations while Principal Components require $O(n^3)$. It should be mentioned that performance improvements can be achieved using more efficient, i.e., multi-resolution, algorithms rather than specialized integrated circuits, e.g., ASICs.

Advantageously, multi-resolution processing also offers increased adaptability in time while providing an expanded feature space. In fact, compact bases possessed by wavelet transforms often provide more efficient representations of target signals that are more easily interpreted, since wavelets provide a much better basis for representing non-stationary processes. It should also be mentioned that multi-resolution processing primarily provides an expanded feature set, which advantageously can lower the performance requirements of downstream classifier stages. Stated another way, the better the feature extractor, the less sophisticated the classifier needs to be in achieving a predetermined classifier performance. FIG. 1 illustrates four classes of objects of interest in theater ballistic missile (TBM) problems. The identification of classes of theater ballistic missile (TBM) objects during an orbital exo-atmospheric flight is a significant challenge. More specifically, the object set considered for this analysis consisted of four ballistic missile representative objects:

(1) a re-entry vehicle (RV) 10;

(2) an associated object (AO, or ACM) 20;

(3) a booster 30; and (4) burnt solid fuel (debris) 40.

FIGS. 2a–2c depict three-dimensional (3-D) object models of corresponding portions to the missile illustrated in FIG. 1. As discussed in detail below, these 3-D object models employed in the various simulations needed to develop the IR seeker.

FIG. 3 is a high-level block diagram of a pattern recognition system employing a multi-resolution feature extraction method according to the present invention. As shown in FIG. 3, the "physical world" is composed of the four object classes illustrated in FIG. 1; the problem is to discriminate between these objects. It should be readily apparent that the preceding statement does not mean that there will only be four objects in the field of view; in general, there will be orders of magnitude more that four objects. The IR seeker system 100 takes measurements (images) of these objects, e.g., employing an optical system 110. The raw imagery produced by the optical system is processed by a collection of algorithms implemented in a pre-processor 120, e.g., an adaptive, non-uniformity compensation processor, to clean up the imagery. It will be appreciated that at this point, the data space is highly redundant. The data is then mapped by some transform, e.g., a unitary transform such as Principal Components, Spectral Decomposition, Time-Frequency Decomposition, etc. for the conventional system or the multi-resolution feature extractor on the system according to the present invention, i.e., the image data is processed by a feature extractor 130, which produces a so-called feature space. It will be appreciated that the feature space will, in general, have a greatly reduced dimensionality. The feature set found in the feature space advantageously forms inputs to a classifier 140, e.g., as a neural network. The output of classifier 140 is applied to target selector 150.

It will be appreciated that measurement space, the pattern space, the feature space, and the classification space are depicted as being stored in a single memory 160. This depiction is for convenience of illustration; each of the elements, e.g., feature extractor 130 and classifier 140, advantageously could be coupled to a dedicated memory. Moreover, it will be appreciated that the processors 131 and 141 associated with feature extractor 130 and classifier 140, respectively, advantageously can be coupled to feature extractor and classifier rather than being co-located in these devices.

In order to evaluate the operation of the system illustrated in FIG. 3, MIT/Lincoln Laboratories has provided the solid fuel debris signature model, which is based on observations of a representative rocket motor, to Raytheon Missile Systems Company (RMSC). The debris is modeled as prisms, with piece dimension, rotational motion initial conditions and initial temperature randomly drawn from uniform distributions. For the remaining object classes, the IR signatures are generated in a several step process. In addition, a government provided data package contains object geometry, temperature profiles and surface materials for the known threat sets. These three parameters are then used to create 3-D object models, as illustrated in FIGS. 2a–2c, which are input into an RMSC simulation. The simulation then computes the IR signature of the object by finding its projected area given the rotational motion. The model generation steps through input Is parameters to ensure that the feature space is spanned. Post-processing code allows the addition of realistic sensor noise for inclusion in both training and performance evaluation data. The data length is 256.

In the training data, there are 7992 realizations, i.e., one distinct data series with 256 samples, for the RV object, 7992 realizations for the booster, 15984 realizations for the ACM, and 2000 realizations for the debris. Five hundred realizations were randomly generated for each of the four objects in the performance evaluation data based on the same object models. For the booster and debris objects, only 164 realizations in the performance data are inside the field of view. Both noise-free and noise-added data were generated and analyzed.

FIG. 4 is a high level flowchart illustrating the operation of the system of FIG. 3 in accordance with the multi-resolution feature extraction method according to the present invention. During step S1, the multi-resolution feature extraction technique, which will be described in greater detail below, is executed in the feature extractor 130 to thereby generate feature space from pattern space.

FIGS. 5a–5d show four templates RV(f, t), ACM(f, t), BOOS(F, t), and DEBR(f, t), respectively, for the four objects illustrated in FIG. 1. As discussed in more detail below, each of these templates are generated by first transforming each individual one dimensional (1-D) realization in the training data sets into a two dimensional (2-D) function, and then averaging them together. More specifically, FIGS. 5a–5d shows 3-D plots of these four templates.

Still referring to FIG. 4, a confusion matrix (CM) is calculated, as discussed in more detail below, during step S4 and the resultant CM is applied to the classifier 140, which performs the discriminant function, discussed below, during step S5. A check is then performed to determine whether there is more than one object in the field of view, i.e., in feature space, during step S2. When the answer is negative, a null loop is executed, i.e., the check is repeated periodically until the answer is affirmative. When the answer is affirmative, a probability of error vector (PV) is calculated during step S3. Then, the output of the classifier 140 is applied to the target selector 150 during step S6, whereby the target(s) of interest are selected, using PV when it is available, and tracked.

Figure 6:
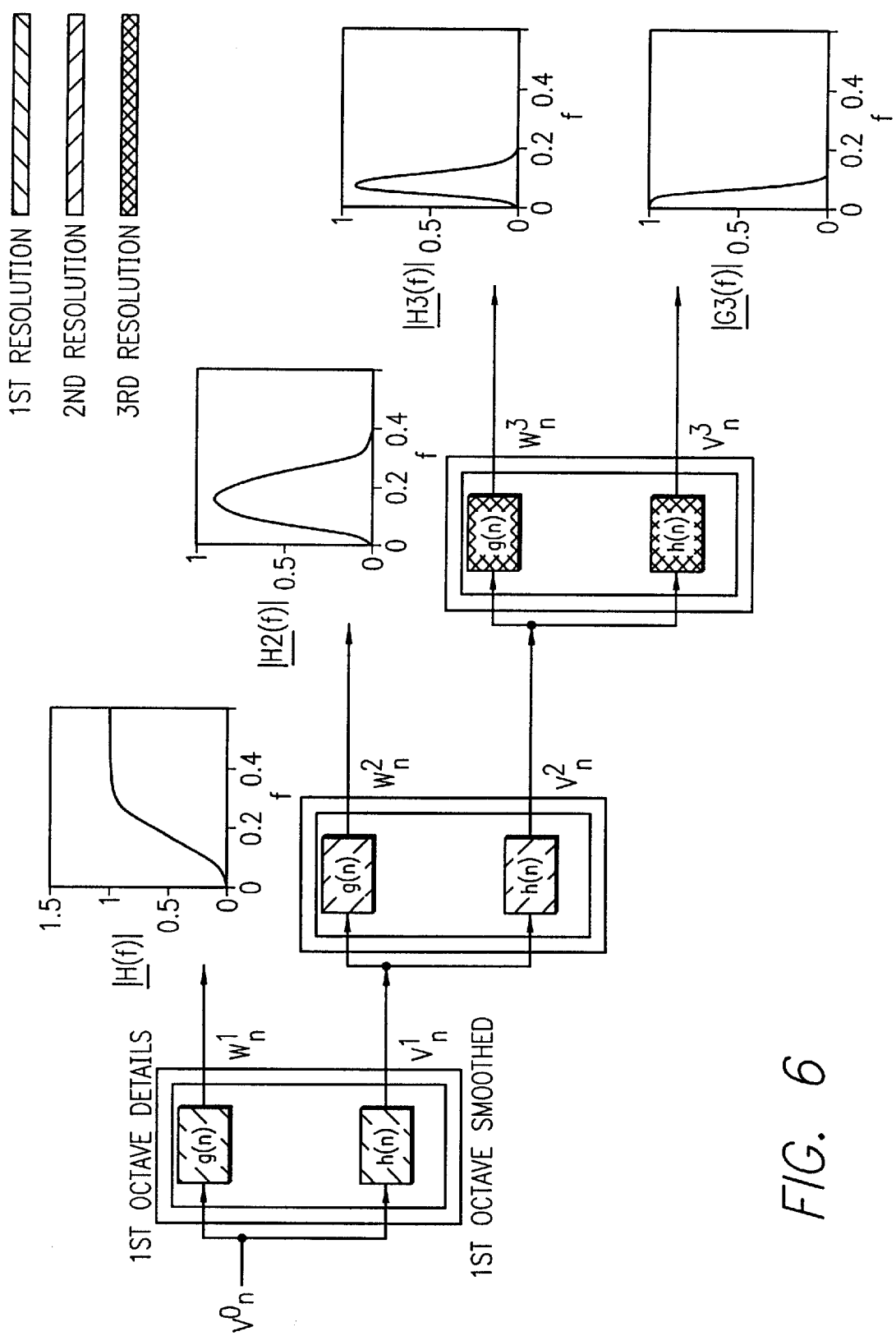
FIG. 6 illustrates a one-dimensional discrete wavelet transform (DWT) pyramidal technique which advantageously can be employed in the multi-resolution feature extraction method according to the present invention.

Referring now to FIG. 6, the discrete wavelet transform (DWT), or the more general discrete wavelet packet (DWP), is depicted as a series of stages, where each stage performs a generalized frequency-phase decomposition. Thus, the DWT provides an orthogonal subspace decomposition of matrices, which allows a multi-resolution approach to many image analysis problems. The discrete wavelet transform will be discussed briefly below, since discrete wavelet transforms are known from works such as S. Mallat, *A Wavelet Tour of Signal Processing*, Academic Press, 1998, and I. Daubechies, 'Ten Lectures on Wavelets,' SIAM, Philadelphia, Pa., 1992.

Multi-resolution techniques have been employed successfully in a number of signal processing areas. Most of these initial applications exploited the compact nature of the DWT for image compression. More recently, advances in compression, thresholding, and non-standard forms has greatly expanded the universe of possible uses. Further details regarding compression employing DWTs are provided in the article by Antonini, M. Barlaud, P. Mathieu, and I. Daubechies entitled 'Image Coding Using Wavelet Transform,' IEEE, Trans. Image Processing, Vol. 1, pp. 205–220, 1992, and the article by Nasrabadi and R. King entitled 'Image Coding Using Vector Quantization: A Review,' IEEE, Trans. Commun., Vol. 36, August 1988. Further details regarding thresholding implemented with DWTs are found in the article by D. L. Donoho entitled 'Denoising via soft thresholding,' IEEE Trans. on Information Theory, v. 41, no. 3, pp 613–627, 1995. Finally, information regarding the application of DWTs to non-standard forms is found in the work of G. Beylkin, R. Coifman and V. Rokhlin entitled "Fast Wavelet Transforms and Numerical Algorithms I," Commun. Pure Applicat. Math., V. 44, pp. 141–183, 1991. It should be mentioned that all of these articles are incorporated herein by reference.

As mentioned above, the discrete wavelet transform is a generalized frequency-phase decomposition into multiple resolution levels. The DWT is characterized by a dilation (frequency) parameter and a translation (phase parameter). In contrast to the conventional Fourier transform, which is localized in frequency only, the basis functions for the discrete wavelet transform are localized in both frequency and time. It should be mentioned that it is this dual localization that renders large classes of functions sparse in the wavelet domain, which advantageously allows the system depicted in FIG. 3 to exhibit improved target discrimination and classification.

More specifically, FIG. 6 depicts a one-dimensional pyramidal multi-resolution implementation of an algorithm for DWT, which algorithm was suggested in 1989 by. S. Mallat in the paper entitled 'A theory for Multi-resolution Signal Decomposition: The Wavelet Representation,' IEEE Trans. Pattern Anal. Mach. Intel, Vol. 11, pp. 674–693, 1989. The Mallat DWT algorithm, like FFT algorithms, is a fast, linear operation that operates on a data vector. It will be appreciated that neither the Mallet DWT algorithm nor the one-dimensional pyramidal multi-resolution implementation of that algorithm for DWT processing have been previously applied to multi-resolution feature extraction methods. It will also be appreciated that the Mallat DWT algorithm is one of many multi-resolutions algorithms that advantageously can be applied in implementing the multi-resolution feature extraction method and system according to the present invention.

As illustrated in FIG. 6, at each stage in the decomposition, the signal is filtered by a quadrature mirror filter (QMF) pair, g(n) and h(n), which separately low pass and high pass filter the incoming signal, i.e., the contents of pattern space. It will be appreciated that the low pass filter, followed by a down-sampling operation, decreases the resolution of the signal. The high pass filter splits the band in two and then passes the split bands off to the next resolution level. The high pass filtered outputs, called the details, become the wavelet transform coefficients. The result is an orthogonal subspace decomposition with no redundancy.

Although the DWT is being employed in the exemplary multi-resolution feature extraction method under discussion, it will be appreciated that the discussion is equally applicable to discrete wavelet packet processing. The discrete wavelet packet (DWP) is a generalization of the DWT in that both the details and smoothed (low pass) portions of the data vector are filtered at each octave. The DWP tree is then pruned; a 'best basis' is selected based on entropy or similar criteria. It should be mentioned that only half of the data length, i.e., 128 samples, is used for the DWP transform. For simplicity, a 'full tree' decomposition, instead of using the 'best basis', is used. Thus, all of the so-called time-frequency atoms have the same sizes and include the same sample number. A Daubechies 4 orthonormal wavelet is used to generate the QMF.

In other words, a time series is transformed into a 2-D time-frequency function by the DWP transform:

$$y(f,t) = WP\{x(t)\}. \quad [1]$$

The sizes in the time and frequency domains depend on the decomposition levels of DWP. For a four level decomposition, a time series with 128 samples is transformed into an 8×16 2-D time-frequency function, with eight sub-bands along the frequency axis and 16 temporal samples along the time axis. Four templates RV(f, t), ACM (f, t), BOOS(f, t), and DEBR(f, t) for the four objects are generated by first transforming each individual 1-D realization in the training data sets into a 2-D function, and then averaging them together. FIGS. 5a–5d shows 3-D plots of these four object templates.

As shown in FIGS. 5a–5d, the transformed 2-D templates provide additional features for different objects. These features are distinct from those generated by, for example, the FFT based feature extractor discussed above. More specifically, RV(f, t) and BOOS(f, t) both exhibit larger modulations in the lowest frequency sub-band than either ACM(f, t) or DEBR(f, t). On the other hand, ACM(f, t) and DEBR(f, t) both present higher intensities in the second lowest sub-band than either RV(f, t) or BOOS(f, t). These features are useful for the technique discussed below. Each individual 1-D realization in the performance data is also transformed into a 2-D time-frequency function. Mean-square-errors (MSEs) of the 2-D functions between performance data and the templates from the training data are then calculated. Each realization of observed objects in the performance data is compared with all the four templates separately.

The minimum of the four resulting MSEs is serving as the criterion for the scoring in the 4×4 confusion matrix, CM. For example, if the minimum MSE is between a RV realization and the RV template, the system would add one score to CM(1,1), and so on. For a performance data set with 500 realizations, the ideal confusion matrix should have the diagonal elements scoring 500 each. All the off diagonal elements would score zero. It will be appreciated that the higher the off-diagonal element scoring, the more confusion is said to exist.

The technique discussed immediately above employs a single feature, the MSE value. The overlapping of the feature values for different objects causes the high scoring of the off-diagonal elements in the confusion matrix. The use of multiple distinct features advantageously can help to reduce the overlapping of feature values and thus reduce the off-diagonal scoring. In contrast, a simple cascaded classifier employing and using multiple features significantly improves the confusion matrix results for the multi-resolution discrimination. The multiple feature classifier advantageously can be cascaded, i.e., connected in series with, to the single feature (MSE) classifier discussed above.

It should be mentioned that the feature values measured from the observed objects serve as restricted conditions for the scoring process in the confusion matrix construction. Four features, the intensity in the second lowest sub-band, the temporal profile in the lowest frequency sub-band, the modulation intensity, and the DC level of each observed object have been used in implementing the multiple feature classifier.

An exemplary formulation of a quadratic discriminant function for the $i^{th}$ object, given a feature vector $\vec{x}$, assuming that the features are independent and that the training data is normally distributed, can be written in the form of Equation [2], namely:

$$\vec{g}_i(\vec{x}) = \vec{x}^T W_i \vec{x} + \vec{w}_i^T \vec{x} + w_i^{N+1} \quad [2]$$

where $$W_i = \frac{1}{2}\Sigma_i^{-1}, \vec{w}_i = \vec{m}_i \Sigma_i^{-1}, \quad [3]$$

$$w_i^{N+1} = \frac{-1}{2}\ln|\Sigma_i^{-1}| + \ln[P(s_i)] + m_i^T \Sigma_i^{-1} m$$

and $P(S_i)$ is the well known probability function. It will be noted that the assumption of a Gaussian distribution implies that the discriminant function is completely characterized by its first two moments:

$$\vec{m}_i \equiv \text{Statistical Mean Vector of Training Data Set for } i^{th} \text{ class} \quad [4]$$

and $$\Sigma_i \equiv \text{Statistical Covariance Matrix of Training Data Set for } i^{th} \text{ class} \quad [5]$$

FIG. 7a lists some possible object features and their origin which advantageously can be employed as a basis for feature extraction. It will be appreciated that the listing is illustrative, not exhaustive.

As previously mentioned, the so-called confusion matrix (CM) provides a statistically valid way of measuring the performance of the classification techniques. More specifically, let $N(x^i|x_T^j)$ be the number of times (scoring) that observed object $x^i$ was actually classified as the object $x_T^j$ generated for the training sets. In the scoring process, each individual observed object $x^i$ is compared with all the objects $x_T^j$ in the training sets. Therefore, the confusion matrix indicates the performance measure of each individual observed object. For the four object system that is being considered here, the 4×4 confusion matrix, CM, would have the following form:

$$CM = \begin{bmatrix} N(x^1|x_T^1) & N(x^1|x_T^2) & N(x^1|x_T^3) & N(x^1|x_T^4) \\ N(x^2|x_T^1) & N(x^2|x_T^2) & N(x^2|x_T^3) & N(x^2|x_T^4) \\ N(x^3|x_T^1) & N(x^3|x_T^2) & N(x^3|x_T^3) & N(x^3|x_T^4) \\ N(x^4|x_T^1) & N(x^4|x_T^2) & N(x^4|x_T^3) & N(x^4|x_T^4) \end{bmatrix} \quad [6]$$

In Equation [6], N is the so-called scoring number. The entries of the confusion matrix are used by the Classifier function shown in FIG. 3 for classifying each individual observed object.

In a real tactical system, it is extremely likely that there will be significantly more than one object in the field of view. For this case, an alternative metric advantageously has been developed. The system according to the present invention implements one statistically valid performance measure, i.e., the Probability of Error vector (PV). Since the primary objective of the object classifier is to successfully discriminate the RV 10 from the other three object classes 20, 30 and 40, only the RV object generated from the training sets is used to classify all the observed objects in the field of view (FOV). In the scoring process, all observed objects $x^i$ in FOV are compared with the RV object $x_T^1$ from the training sets. For the four object system that is being considered here, the 4×1 probability-of-error vector, PV, takes the form:

$$PV = \begin{bmatrix} N(x_T^1|x^1) \\ N(x_T^1|x^2) \\ N(x_T^1|x^3) \\ N(x_T^1|x^4) \end{bmatrix} \quad [7]$$

The results of the probability-of-error vector is available to the target selector 150 in FIG. 3 for target selections among multiple objects in the FOV, as illustrated in FIG. 4.

FIG. 7*b* illustrates the confusion matrix CM for the multi-resolution MSE case with noise while FIG. 7*c* depicts a normalized multi-resolution MSE confusion matrix with noise. FIG. 7*d* shows the confusion matrix obtained using the multi-resolution MSE method from noise-free data. It will be appreciated that this result is very similar to the result in FIG. 7*b*, indicating that the multi-resolution MSE method is quite robust to seeker noise.

Finally, the confusion matrix obtained using the cascaded multiple-feature-extraction technique is shown in FIG. 7*e*; the normalized result of FIG. 7*e* is given in FIG. 7*f*. It is be appreciated that the Non-Target to Target confusion rate advantageously has been reduced from 40% when a single feature is employed to only 12% when multiple feature extractions are implemented.

FIGS. 7*g* and 7*h* present performance comparisons for PV. As discussed earlier, the appropriate performance metric for the tactical case of having more than one object in the field of view is the Probability of Error vector (PV). To confirm this statement, it was assumed that four objects appeared in the field of view, one from each class. The probability of error obtained using the multi-resolution MSE method is shown in FIG. 7*g*, and the normalized result of FIG. 7*g* is calculated and shown in FIG. 7*h*. It will be appreciated that the successful rate for identifying RV 10 with respect to the other 3 objects 20, 30, and 40 is 86%, and 7%, 6%, and 1% of RV 10 were mistakenly identified as ACM, booster, and debris, respectively. Again, the data set was the same as that used in the earlier analyses. It should be mentioned that the results in FIGS. 7*g* and 7*h* use only a single feature (MSE values), and indicate that this feature is quite appropriate for the classification task. Therefore, the Probability of Error vector PV advantageously can be employed for judging the usefulness of a feature for object classification.

It should also be mentioned that Probability-of-Error vectors using multiple features advantageously can be constructed, following the example provided above. Thus, the performance of PV can be improved significantly by incorporating multiple features.

It should again be mentioned that one of the demonstrated advantages of the multi-resolution formalism is the possible identification of additional features not obvious from traditional spectral analyses. In fact, since much of the overall target discrimination and classification formalism remains the same, the most fertile research in developing improved IR seekers is expected to be in identification and interpretation of additional object features. The multi-resolution feature extraction method and corresponding system according to the present invention illustrates how the cascading of multiple features significantly improves the confusion matrix and the results of the multi-resolution discrimination.

It should also be mentioned that the analysis performed using data from the SM-3 LEAP program demonstrates that many of the techniques, in particular LDB, are applicable to a wide range of programs and technologies. The applications include, but are not limited to, ATR, Threat Identification, and Extraction of Targets from Clutter.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A multi-resolution feature extraction method employing object templates formed by transforming time variant image data for each of a plurality of objects into a respective multi-resolution template and averaging all templates for each respective object to thereby generate object templates, said method comprising the steps of:

transforming an incoming time variant data signal into a multi-resolution data signal;

comparing the multi-resolution data signal to each of the object templates; and generating a feature vector when the multi-resolution data signal correlates to one of the object templates.

2. The multi-resolution feature extraction method as recited in claim 1, wherein the transforming step performs a discrete wavelet transform step.

3. The multi-resolution feature extraction method as recited in claim 1, wherein the transforming step performs a discrete wavelet packet step.

4. The multi-resolution feature extraction method as recited in claim 1, wherein the transforming step converts the incoming time variant data signal into a multi-resolution data-signal which is localized in both time and frequency.

5. A multi-resolution feature extraction method comprising the steps of:

transforming time variant image data for each of a plurality of objects into a respective multi-resolution template;

averaging all templates for each respective object to thereby generate object templates;

transforming an incoming time variant data signal into a multi-resolution data signal;

comparing the multi-resolution data signal to each of the object templates; and generating a feature vector each time the multi-resolution data signal correlates to one of the object templates.

6. The multi-resolution feature extraction method as recited in claim 5, wherein each of the transforming steps performs a discrete wavelet transform step.

7. The multi-resolution feature extraction method as recited in claim 5, wherein each of the transforming steps performs a discrete wavelet packet step.

8. The multi-resolution feature extraction method as recited in claim 5, wherein the transforming steps converts the incoming time variant image data and incoming time variant data signal into a multi-resolution template and a multi-resolution data-signal, respectively, each of which is localized in both time and frequency.

9. A method for operating a multi-resolution seeker system, comprising the steps of:

converting time variant image data for each of a plurality of objects into a respective multi-resolution template;

averaging all templates for each respective object to thereby generate object templates;

transforming an incoming time variant data signal into a multi-resolution data signal;

comparing the multi-resolution data signal to each of the object templates; and generating a feature vector each time the multi-resolution data signal correlates to one of the object templates;

calculating a confusion matrix (CM); classifying the feature vectors as one of the objects to thereby produce classified objects responsive to the CM; and selecting a target from said classified objects.

10. The multi-resolution feature extraction method as recited in claim 9, wherein the transforming step performs a discrete wavelet transform step.

11. The multi-resolution feature extraction method as recited in claim 9, wherein the transforming step performs a discrete wavelet packet step.

12. The multi-resolution feature extraction method as recited in claim 9, further comprising:

computing a probability-of-error vector (PV) when there are more than one of the objects in the incoming time variant data signal and selecting a target from said classified objects responsive to the PV.

13. A multi-resolution feature extractor employing object templates formed by transforming time variant image data for each of a plurality of objects into a respective multi-resolution template and averaging all templates for each respective object to thereby generate object templates, comprising:

a memory which stores the object templates and a feature extractor which transforms an incoming time variant data signal into a multi-resolution data signal, compares the multi-resolution data signal to each of the object templates, and generates a feature vector each time the multi-resolution data signal correlates to one of the object templates.

14. A multi-resolution seeker system, comprising:

a memory;

a feature extractor operatively connected to the memory which converts time variant image data for each of a plurality of objects into a respective multi-resolution template, averages all templates for each respective object to thereby generate object templates, transforms an incoming time variant data signal into a multi-resolution data signal, comparing the multi-resolution data signal to each of the object templates, and generates a feature vector each time the multi-resolution data signal correlates to one of the object templates;

a processor operatively coupled to the memory, which processor calculates a confusion matrix (CM);

a classifier operatively connected to the memory which classifies the feature vectors as one of the objects responsive to the CM to thereby produce classified objects; and a selector operatively coupled to the memory which selects a target from said classified objects.

15. The multi-resolution seeker system as recited in claim 14, wherein:

the processor includes means for computing a probability-of-error vector (PV) when there are more than one of the objects in the incoming time variant data signal and the selector selects the target from said classified objects responsive to the PV.

16. A feature extractor comprising:

first means for receiving and transforming a time variant data signal into a multi-resolution data signal, second means for comparing the multi-resolution data signal to each of a plurality of object templates, and third means for generating a feature vector based on a correlation of the multi-resolution data signal to one of the object templates.

17. The invention of claim 16, wherein the object template is formed by transforming time variant image data for each of a plurality of objects into a respective multi-resolution template and averaging all templates for each respective object.

* * * * *